Feb. 16, 1965   W. GOLDBERG ETAL   3,170,159
MOTION PICTURE CAMERA
Filed Jan. 2, 1962   2 Sheets-Sheet 1

INVENTORS
WILLI GOLDBERG
BY AUGUST BROHL
Toulmin & Toulmin
Attorneys

Feb. 16, 1965 W. GOLDBERG ETAL 3,170,159
MOTION PICTURE CAMERA
Filed Jan. 2, 1962 2 Sheets-Sheet 2

INVENTORS
WILLI GOLDBERG
BY AUGUST BROHL
Toulmin & Toulmin
Attorneys

United States Patent Office 3,170,159
Patented Feb. 16, 1965

3,170,159
MOTION PICTURE CAMERA
Willi Goldberg and August Bröhl, both of Wetzlar (Lahn), Germany, assignors to Ernst Leitz Gesellschaft mit beschrankter Haftung, Wetzlar (Lahn), Germany
Filed Jan. 2, 1962, Ser. No. 163,647
Claims priority, application Germany, Jan. 7, 1961, L 37,896
4 Claims. (Cl. 352—171)

The present invention relates to a motion picture camera having a reflex view-finder and an exposure meter built into the casing thereof, more particularly, to an arrangement for reflecting portions of the light received through the objective to the view-finder and to the photoelectric cell of the exposure meter.

Reflex cameras have been constructed wherein an optical prism is mounted in the path of light rays received through the objective and in front of the objective diaphragm to reflect a portion of these light rays onto the view-finder arrangement. In this manner the picture as seen by the operator in the view-finder is independent of the size of the diaphragm opening.

In addition, motion picture cameras have been constructed wherein a suitable structure is provided behind the objective diaphragm in order to reflect a portion of the light entering the objective onto the photoelectric cell of an exposure meter. One such construction comprises mounting a rotating shutter at an angle of 45° with respect to the optical axis and providing a reflecting surface on the side of the shutter facing the objective. The photoelectric cell is positioned to receive light reflected from the angularly arranged shutter. By reflecting the light rays received through the diaphragm onto the photoelectric cell, the measurement of the illumination as indicated by the exposure meter is directly related to the light which will impinge on the film. This relationship is necessary for satisfactory photographic results.

While both of the above-described light-reflecting systems have been utilized, it is a disadvantage in known camera constructions that only one of the above systems is used in any one camera. A further drawback is that the positioning of the rotating shutter in the path of light rays necessitates a considerable increase in the size of the camera casing. As a result, the size of the casing, particularly in eight millimeter motion picture cameras, reaches undesirable dimensions.

It is therefore the principal object of the present invention to provide a novel and improved motion picture camera having a reflex view-finder and an exposure meter.

It is a further objective of the present invention to provide a simplified optical arrangement in the motion picture camera of this invention for reflecting portions of the light entering the objective onto both the view-finder and the photoelectric cell of the exposure meter.

The improved motion picture camera of the present invention is obtained by positioning a divided prism in the path of rays entering the objective between the objective and the diaphragm. This divided prism has a common surface which is partially reflecting so that a portion of the light rays entering the objective is reflected to the view-finder. The rotating shutter is positioned behind the diaphragm and has a reflecting surface on the surface facing the objective. The light rays passed by the divided prism through the diaphragm are reflected by the shutter back onto the divided prism. These light rays are then reflected onto a photoelectric cell of the exposure meter.

In one embodiment of this invention the partially reflecting surface of the prism is provided at its optical axis with a small completely reflecting portion. In this construction the partially reflecting prism surface reflects a portion of the light rays entering the objective to the view-finder. A lens system is provided between the diaphragm and the shutter for focusing the light rays reflected from the shutter onto the small total reflecting portion. All of the light rays are then reflected by this total reflecting portion onto the photoelectric cell.

Other modifications of this embodiment are possible. Several of these modifications will be described in detail but one of the modifications comprises the elimination of the total reflecting surface on the prism. A further modification comprises mounting the two prisms in such a way that an air-gap is formed between the adjacent surfaces thereof.

Other objects and advantages of this invention will be apparent upon reference to the accompanying description when taken in conjunction with the following drawings, wherein FIGURE 1 is a vertical sectional view of a motion picture camera embodying the present invention;

Figure 1:
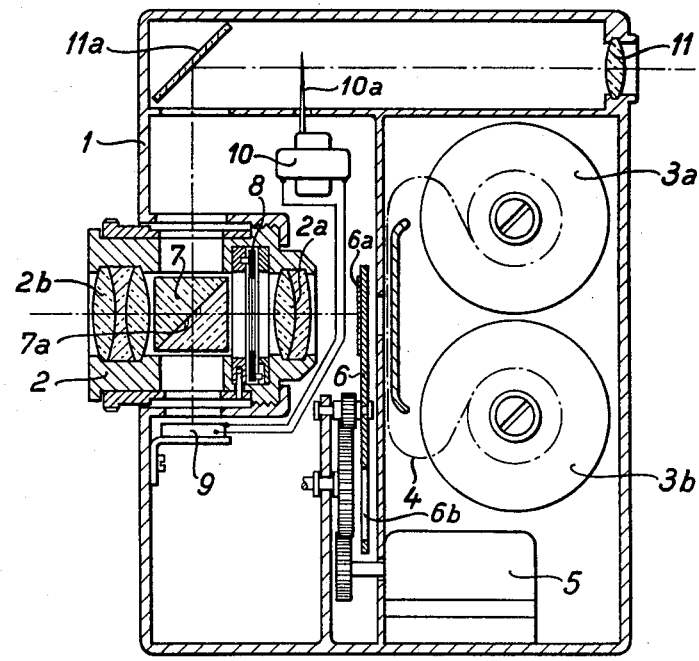
Figure 2:
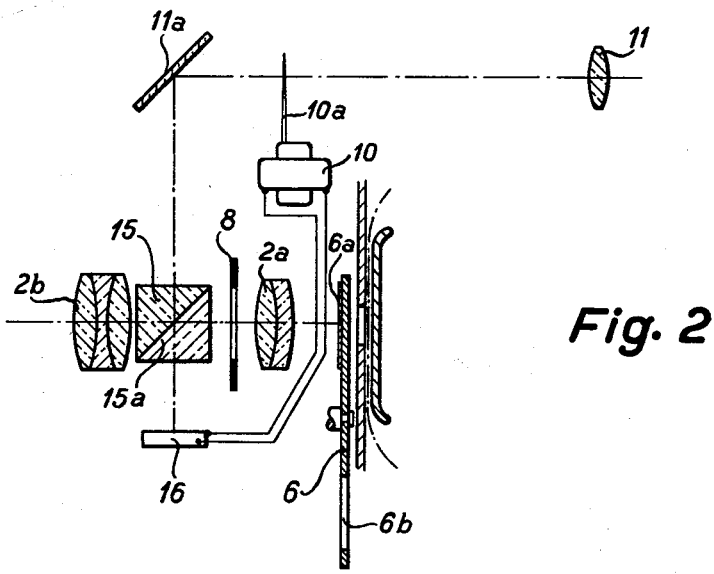
FIGURE 2 is a schematic view of a modification thereof.
Figure 3:
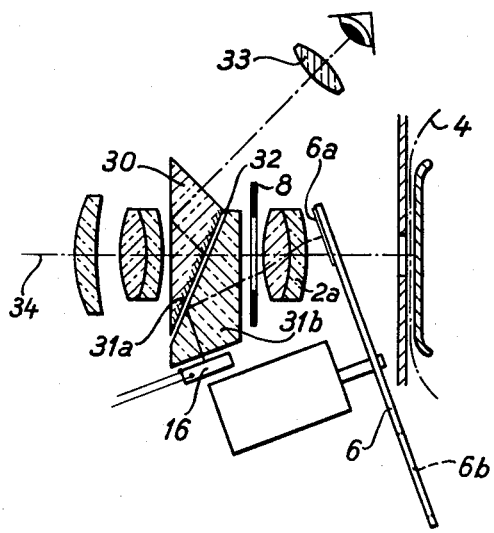
FIGURE 3 is a schematic view of a further modification of the present invention.

Returning now to the drawings wherein like reference symbols indicate the same parts throughout the various views, there is illustrated in FIGURE 1 a casing 1 of a motion picture camera according to the present invention. The casing 1 comprises an objective 2 having rear objective lenses 2a and front objective lenses 2b. Also in the casing are a pay-out reel 3a and a take-up reel 3b for film indicated at 4. There is also a driving motor 5 which rotates a revolving shutter 6 the surface of which facing the objective is reflecting and indicated at 6a. The casing 1 contains all the other structural elements necessary for a motion picture camera and the mechanism for the intermittent feeding of the film is not illustrated in the drawings for purposes of clarity.

A dividing prism 7 and an objective diaphragm 8 are also mounted in the objective 2. With respect to the direction of light entering the objective lens 2b, the diaphragm 8 is positioned behind the prism 7. The divided prism 7 is formed of two prisms whose contacting surfaces are cemented together to form a common surface which is partially reflecting. In the center of this partially reflecting surface on the optical axis of the prism 7 there is a small totally reflecting zone 7a.

The camera is also provided with an exposure meter comprising a photoelectric cell 9 and a measuring instrument 10 electrically connected thereto. The instrument 10 has an indicating pointer 10a which extends into the field of the view-finder arrangement indicated at 11 and 11a.

The prism member 7 is so constructed that about 20% of the light rays impinging thereon through the objective lens are reflected to the view-finder 11 and 11a. The remaining 80% of the light rays (with losses in the glass being disregarded) are passed through the prism member 7 through the diaphragm 8 and emerge from the rear end of the objective 2 to impinge either on the reflecting surface 6a or onto the film 4 through the cut-out portion 6b of the shutter.

The light rays which impinge on the reflecting surface 6a are reflected therefrom into the objective through the rear lenses 2a. The optical characteristics of the lenses 2a are such that all of the light reflected by the shutter surface 6a is focused onto the total reflecting zone 7a of the prism member 7. This reflecting zone 7a then reflects the light onto the photoelectric cell 9.

This described arrangement has all of the advantages of the two prior art arrangements as discussed above. Since the dividing prism 7 is positioned in front of the

towards said objective, an exposure meter having a photoelectric cell, and optical means mounted between said objective and diaphragm for reflecting a portion of the light rays entering said objective onto said view-finder and passing the remainder of said light rays through said diaphragm and for receiving the light reflected from said shutter and reflecting this light onto said photoelectric cell.

4. A motion picture camera comprising an objective lens having front and rear lenses in spaced relation and an objective diaphragm positioned in said space, a reflex view-finder, a rotating shutter positioned after said diaphragm and behind the rear lens of the objective, there being a reflecting surface on the surface of said shutter facing towards said objective, an exposure meter having a photoelectric cell, a pair of prisms mounted between said objective and said diaphragm to form an air-gap between adjacent surfaces, the one of said adjacent surfaces nearest said objective being partially reflecting to reflect a portion of the light entering said objective to said view-finder, the other of said adjacent surfaces also being partially reflecting, said shutter and said other adjacent surface being inclined at such an angle with respect to the optical axis of the objective so that all of the light rays reflected from said shutter reflecting surface are totally reflected by said other adjacent surface to said photoelectric cell.

References Cited by the Examiner
UNITED STATES PATENTS

| | | | |
|---|---|---|---|
| 1,934,484 | 11/33 | Camilli | 88—16 |
| 2,817,238 | 12/57 | Soehngen | 88—14 |
| 3,060,823 | 10/62 | Nelson | 95—10 |
| 3,127,809 | 4/64 | Denk | 88—16 |

FOREIGN PATENTS

| | | |
|---|---|---|
| 1,199,116 | 6/59 | France. |
| 1,094,585 | 12/60 | Germany. |
| 784,014 | 10/57 | Great Britain. |

NORTON ANSHER, *Primary Examiner.*
EMIL G. ANDERSON, WILLIAM MISIEK,
*Examiners.*